United States Patent [19]
Kerckhaert

[11] Patent Number: 5,924,274
[45] Date of Patent: Jul. 20, 1999

[54] METHOD FOR MANUFACTURING A HORSESHOE PROVIDED WITH AT LEAST ONE CLIP, AND A HORSESHOE MADE THEREBY

[75] Inventor: Rudolf Karel Marie Kerckhaert, Sinaai, Belgium

[73] Assignee: Kerckhaert B.V., AE Vogelwaarde, Netherlands

[21] Appl. No.: 08/843,837

[22] Filed: Apr. 17, 1997

[30] Foreign Application Priority Data

Apr. 17, 1996 [NL] Netherlands ............................ 1002886

[51] Int. Cl.⁶ ........................................................ B21K 15/04
[52] U.S. Cl. ............................ 59/61; 59/62; 59/65; 59/36
[58] Field of Search ..................... 59/36, 38, 39, 59/44, 58, 61, 65, 66, 62, 67, 68, 49

[56] References Cited

U.S. PATENT DOCUMENTS

| | | | |
|---|---|---|---|
| 197,651 | 11/1877 | Miller | 59/65 |
| 208,295 | 9/1878 | Claude | 59/62 |
| 219,632 | 9/1879 | Fritz | 59/62 |
| 260,454 | 7/1882 | Clarke | 59/62 |
| 392,276 | 11/1888 | Le Roy | 59/61 |
| 1,084,676 | 1/1914 | Turner | 59/62 |

FOREIGN PATENT DOCUMENTS

| | | |
|---|---|---|
| 0 633 079 | 1/1995 | European Pat. Off. . |
| 376367 | 8/1907 | France . |
| 406416 | 1/1990 | France . |
| 5775 | 4/1916 | United Kingdom . |

*Primary Examiner*—David Jones
*Attorney, Agent, or Firm*—Bacon & Thomas, PLLC

[57] ABSTRACT

A method for manufacturing a horseshoe provided with at least one clip wherein a rod part with a predetermined length is formed by cutting it from a straight rod. The length of the rod part depends on the desired size of the horseshoe. Part of a first longitudinal side of the rod part is blanked out by a cutting tool such that at least one cam-shaped part remains on the first longitudinal side. Each cam-shaped part is subsequently plastically deformed in a direction which is mainly perpendicular to a top side of the rod part such that a clip which extends substantially perpendicular to the top side is formed. The rod part is bent such that an actual horseshoe is formed. The invention includes the horseshoe obtained by the method.

12 Claims, 4 Drawing Sheets

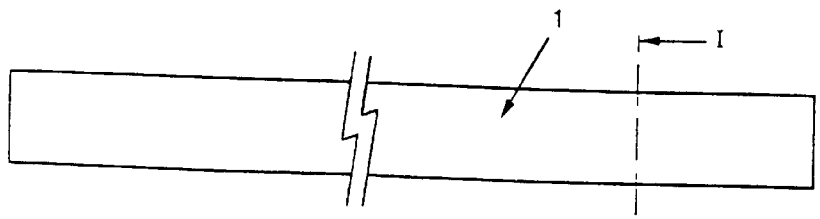 
Fig. 1      Fig. 1A
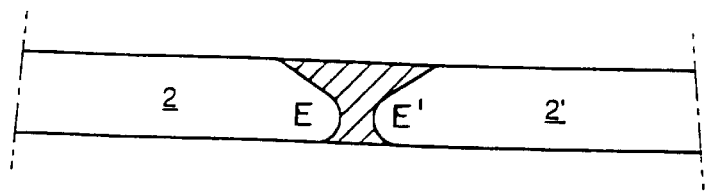
Fig. 2
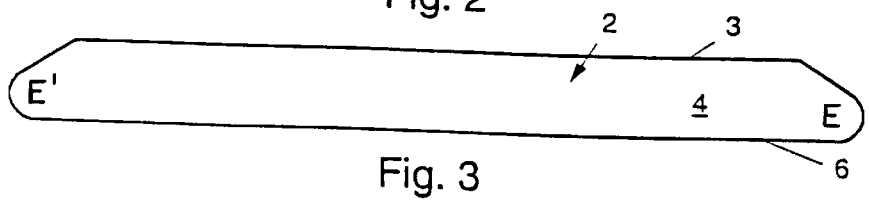
Fig. 3
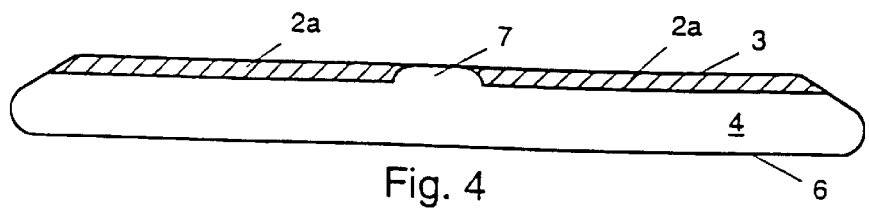
Fig. 4
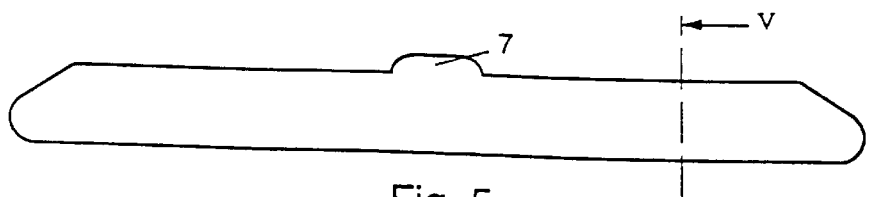 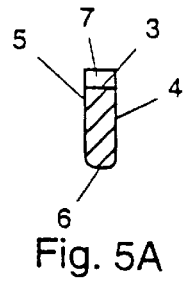
Fig. 5      Fig. 5A
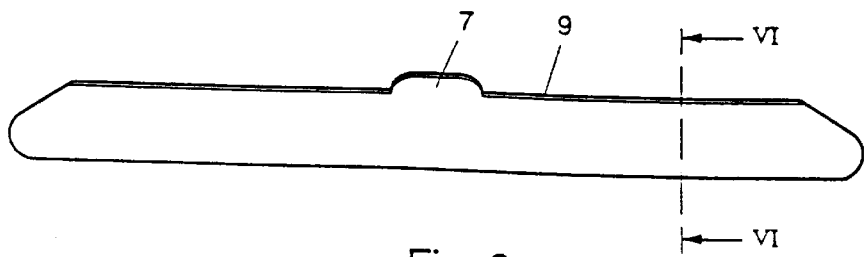 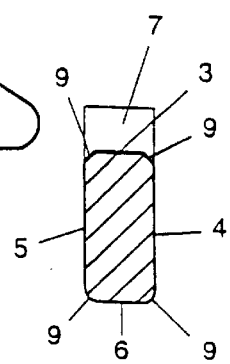
Fig. 6      Fig. 6A

METHOD FOR MANUFACTURING A HORSESHOE PROVIDED WITH AT LEAST ONE CLIP, AND A HORSESHOE MADE THEREBY

BACKGROUND OF THE INVENTION

1. Field of the Invention

The present invention concerns a method for manufacturing a horseshoe provided with at least one clip, such as, for example, a toe clip or two side clips.

2. Description of the Related Art

According to the known method for manufacturing horseshoes with a clip, a clip is drawn from a rod part with a predetermined length by a plastic deformation process in a direction which is mainly perpendicular to a top side of the rod part. The thus obtained clip mainly extends perpendicular to the top side of the rod part and is situated in the middle of the rod part. The rod part is then bent so as to form an actual horseshoe.

A disadvantage of the known method for manufacturing horseshoes is that the clip is drawn from a longitudinal side of the rod part such that an indentation is created in this longitudinal side. The material required for the formation of the clip is obtained from this longitudinal side. As a result, the clip is positioned slightly inward in relation to the longitudinal side of the rod part. After the bending of the rod part, the clip is also positioned slightly inward in relation to the convex outer side of the horseshoe obtained. In order to make the horseshoe fit well on the hoof, however, a recess must be formed in the hoof where the clip will be situated after the horseshoe has been mounted. Apart from the work and time required for forming the recess in the hoof, the hoof is weakened due to the formation of the recess. Moreover, a horseshoe with an indentation in the convex outer side thereof is not very aesthetically attractive.

SUMMARY OF THE INVENTION

The invention aims toward a method for manufacturing a horseshoe by which a horseshoe is obtained without the above-described disadvantages.

According to the invention, a rod part with a predetermined length is formed by cutting it from a straight rod. The which rod part has a first longitudinal side, a top side, a bottom side, a second longitudinal side, and two ends. The length of the rod part depends on the desired size of the horseshoe. Part of the first longitudinal side is blanked out by a cutting tool such that at least one cam-shaped part remains. Each cam-shaped part is subsequently plastically deformed in a direction which is mainly perpendicular to the top side of the rod part such that each clip extends substantially perpendicular to the top side. The rod part is bent such that an actual horseshoe is formed.

Since, before the clip is formed by plastic deformation, a cam-shaped part is first formed on the first longitudinal side of the rod part by cutting away part of the first longitudinal side, the material required for the formation of the clip need not be obtained from the longitudinal side of the rod part which at a later stage forms the convex outer side of the horseshoe. The blanking out of part of the first longitudinal side of the rod part leads to the formation of a new first longitudinal side which forms the convex outer side of the horseshoe after the rod part has been bent. After the clip has been formed by drawing from the cam-shaped part which remains after part of the first longitudinal side has been blanked out, the clip obtained coincides with the new first longitudinal side of the rod part. Thus, after the rod part has been bent, a horseshoe is obtained whose clip stands exactly on the convex outer side of the horseshoe. As a result, it is no longer necessary to form a recess in the hoof for the clip. Consequently, the hoof need not be weakened and the horseshoe can be mounted as such without any time-consuming recess-forming operations being required.

According to a further development of the invention, it is particularly advantageous when, before the cam-shaped part is plastically deformed and the rod part is bent, the rod part is brought to a forging temperature. Thanks to the fact that the rod part is at a forging temperature, the drawing of the clip from the cam-shaped part and the bending of the rod part can be carried out quickly and without any risk of cracking.

Preferably, after the above-mentioned part of the first longitudinal side has been blanked out such that at least one cam-shaped part remains, at least one edge of the rod part forming a transition between new first longitudinal side and the top and/or bottom side is worked such that the transition is provided with a radius or bevel. Thus, the convex outer edges of the horseshoe to be formed are not sharp, so that the horse cannot injure itself on the edges.

Possibly, according to a further development of the invention, the part of the first longitudinal side which is blanked out may be blanked out such that only one cam-shaped part remains situated either in the middle of the rod part or closer to one of the ends so as to form symmetrical or asymmetrical horseshoes, respectively. With asymmetrical horseshoes, one half of the horseshoe is bigger and rounder than the other half of the horseshoe. In order to be able to position the clip on the front side of the horseshoe, however, it is necessary that the cam-shaped part, remaining after a part of the first longitudinal side of the rod part has been blanked out, is situated somewhat off center of the rod part. Thus, left and right horseshoes with a clip may be formed. When the cam-shaped part is situated in the middle of the rod part, a symmetrical horseshoe may be formed.

According to another further development of the invention, the part of the first longitudinal side which is blanked out may be blanked out such that two cam-shaped parts remain situated at approximately one third and two thirds of the length of the rod part, respectively. Here also, the positioning of the cam-shaped parts on the rod part can be selected such that symmetrical or asymmetrical horseshoes may be formed.

After the plastic deformation for the formation of each clip and before the bending of the rod part, a cut may be provided in the rod part.

Moreover, after the plastic deformation for the formation of each clip and before the bending of the rod part, the ends of the rod part can be bevelled on the bottom side such that what are called sponges are formed.

In order to obtain a flat horseshoe provided with regular rivet holes, after the bending of the rod part to form the horseshoe, the horseshoe may be flattened and rivet holes may be punched in the horseshoe. The rivet holes may be punched after the horseshoe has cooled from the forging temperature.

Naturally, the invention also concerns a horseshoe obtained according to the method of the invention.

BRIEF DESCRIPTION OF THE DRAWINGS

The invention will be further illustrated by a number of embodiments, as examples without any limiting character, described hereafter with reference to the drawings, in which:

FIG. 1 shows a top view of a rod;

FIG. 1A shows a sectional view along line I—I in FIG. 1;

FIG. 2 shows ends of two rod parts prior to cutting off a rod part;

FIG. 3 shows a top view of the rod part;

FIG. 4 shows a similar top view of the rod part, wherein the hatching indicates what part of the first longitudinal side is blanked out;

FIG. 5 shows a top view of the rod part after blanking out part of the first longitudinal side;

FIG. 5A shows a sectional view along line V—V in FIG. 5;

FIG. 6 shows the rod part represented in FIG. 5 with the edges of the first longitudinal side bevelled;

FIG. 6A shows a sectional view along line VI—VI of FIG. 6 to a larger scale;

DETAILED DESCRIPTION OF THE PREFERRED EMBODIMENTS

Figure 6B:
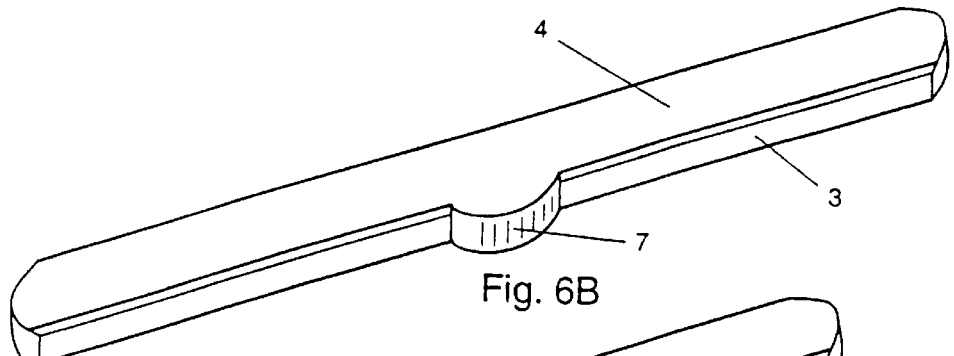
FIG. 6B shows a perspective view of the rod part represented in FIG. 6.
Figure 7:
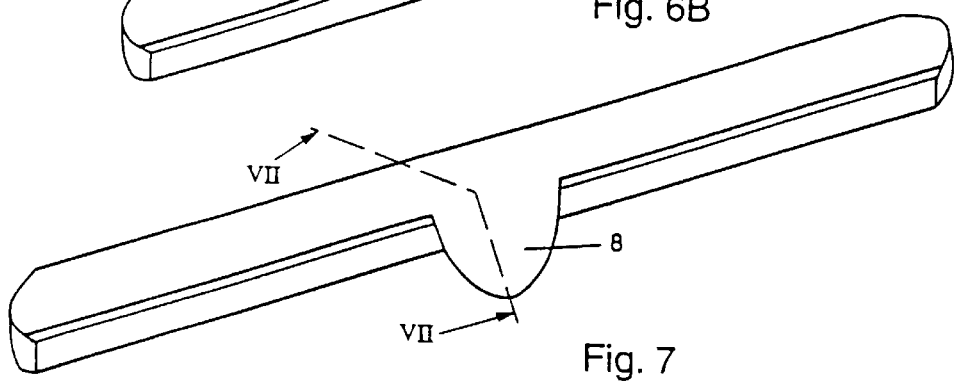
FIG. 7 shows a perspective view of the rod part represented in FIG. 6 with a clip drawn from the cam-shaped part.
Figure 7A:
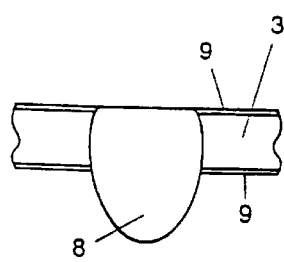
FIG. 7A shows a partial front view of the rod part at the height of the clip.
Figure 7B:
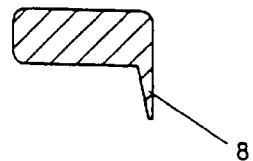
FIG. 7B shows a sectional view along line VII—VII of FIG. 7.
Figure 7C:
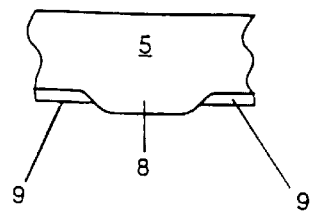
FIG. 7C shows a bottom view of a part of the rod part from FIG. 7 at the height of the clip.
Figure 7D:
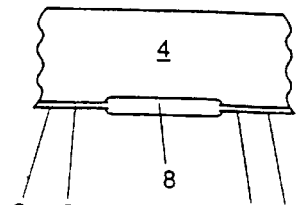
FIG. 7D shows a top view of a part of the rod part from FIG. 7 at the height of the clip.

According to the invention, in order to form a horseshoe provided with at least one clip, a rod part 2, as represented in FIG. 3, is formed by cutting it at a predetermined length from a rod 1, as represented in FIG. 1. The rod forming the basic material of which the horseshoe manufacturer makes a horseshoe may have a rectangular section, as represented in FIG. 1A, but it may also have a section as represented in FIGS. 11A to 11E. In the embodiments represented in FIGS. 11A to 11C, the rod is already provided with a groove 11 in a bottom side 5. Groove 11 forms part of the cut of the finished horseshoe. Apart from the already mentioned bottom side 5, rod part 2 has a top side 4, a first longitudinal side 3 and a second longitudinal side 6. As shown in FIGS. 2 and 3, rod part 2 is cut from rod 1 such that ends, generally indicated E and E', are formed. After rod part 2 has been bent into a horseshoe, first longitudinal side 3 forms a convex outer side of the horseshoe, whereas the second longitudinal side 6 forms a concave inner side of the horseshoe. The length of rod part 2 depends on the required size of the horseshoe. Preferably, when rod part 2 is cut, the ends of the rod part are directly shaped into a specific form by removing the hatched section shown in FIG. 2 during the cutting. From thus obtained rod part 2 with rounded-off ends, a part 2a, hatched in FIG. 4, is then blanked out by a cutting tool such that at least one cam-shaped part 7 remains on a new first longitudinal side 3. Rod part 2, in this case, has a configuration as represented in FIG. 5 with a sectional view as represented in FIG. 5A. In this embodiment, after part 2a has been blanked out to form at least cam-shaped part 7, edges of rod part 2 which form a transition between new first longitudinal side 3 and top 4 and/or bottom side 5 are worked such that a radius or bevel 9 is provided. After this treatment, rod part 2 has a configuration as represented in FIGS. 6, 6A and 6B. As is clearly represented in the sectional view of FIG. 6a, the edges which are turned away from cam-shaped part 7 and which confine second longitudinal side 6 may also be provided with a radius or bevel 9. In general, however, this radius or bevel is already provided in rod 1 which serves as basic material.

Subsequently, cam-shaped part 7 is plastically deformed in a direction which is mainly perpendicular to top side 4 of rod part 2 such that a clip 8 which extends substantially perpendicular to top side 4 is formed. Rod part 2, in this case, has a configuration as represented in FIGS. 7, 7A, 7B, 7C and 7D. Especially FIGS. 7A, 7E, 7C and 7D provide a good example of the configuration of clip 8. It is clear that clip 8 coincides with other parts of longitudinal side 3 and that there is no indentation in longitudinal side 3 at the height of clip 8. Subsequently, rod part 2 is bent such that a horseshoe is formed.

Figure 8:
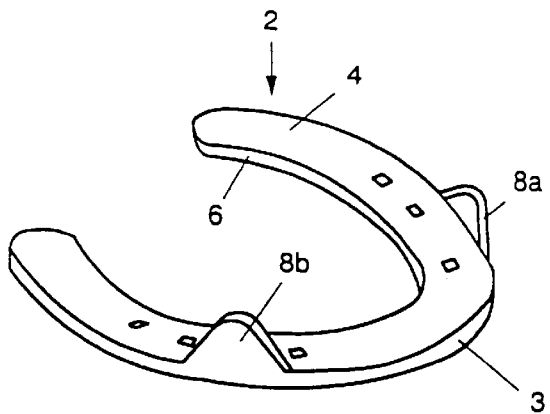
FIG. 8 shows a perspective view of a horseshoe provided with two clips.
Figures 9, 9A:
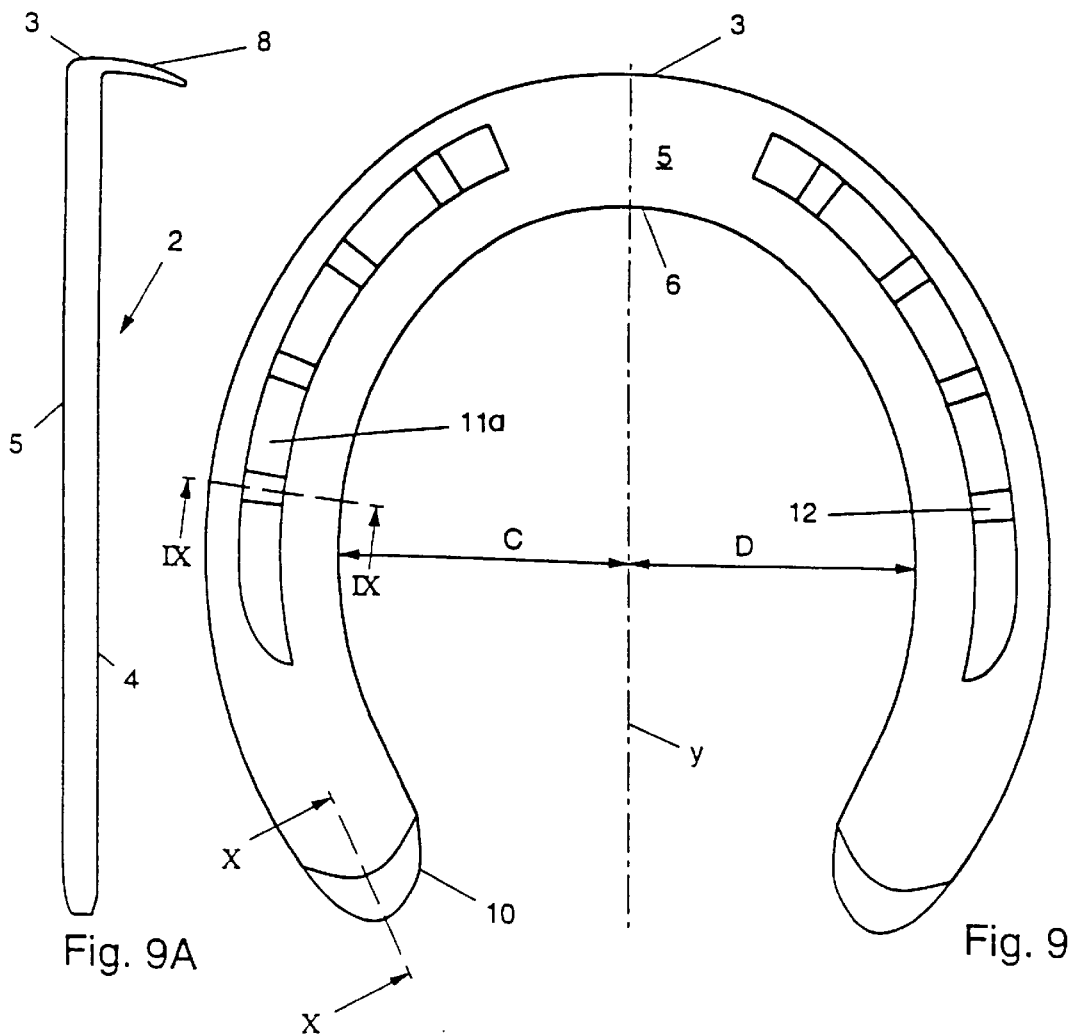
FIG. 9 shows a bottom view of a horseshoe provided with one clip.
FIG. 9A shows a side view of the horseshoe represented in FIG. 9.

A thus manufactured product is represented in perspective in FIG. 8. FIGS. 9 and 9A show a bottom and a side view, respectively, of a horseshoe according to the invention.

The embodiment as represented in FIG. 8 is provided with two clips 8a, 8b. The embodiment as represented in FIGS. 9 and 9a is provided with one clip 8. In rod part 2 which has not been bent yet, a clip can be provided off center or in the middle on rod part 2. With a centrally provided clip 8, the distances C and D should be identical as shown in FIG. 9. As a result, such a horseshoe is symmetrical in relation to the axis Y represented in FIG. 9. When clip 8 is provided off center on rod part 2, a left part of the horseshoe as shown in FIG. 9 may, for example, make a larger curve and may be made rounder than a right part of the horseshoe. Clip 8 which is erected symmetrical in relation to axis Y, is in this case situated on the front side of the hoof, but the rest of the horseshoe is adjusted to the asymmetrical shape which a hoof actually has. Thus, it is possible to obtain left and right horseshoes. With a left or right horseshoe, the distances C and D as shown in FIG. 9 differ from one another.

Figure 10:
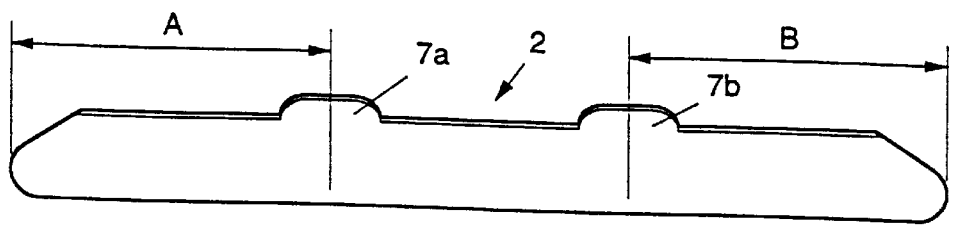
FIG. 10 shows a top view of a rod part provided with two cam-shaped parts.
Figure 11A:
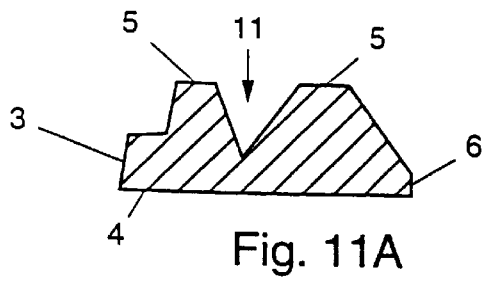
FIGS. 11A to 11E show a number of possible sectional profiles of the rod from which the rod parts can be formed.
Figure 11B:
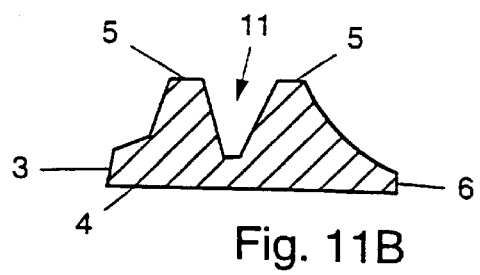
Figure 11C:
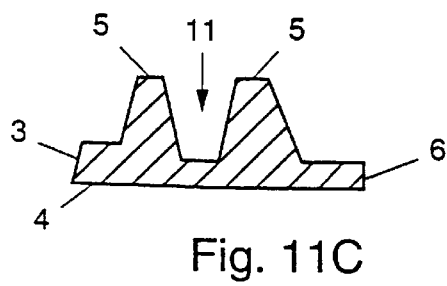
Figure 11D:
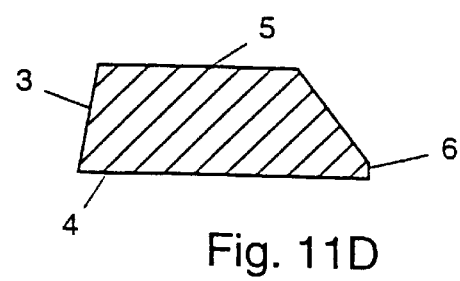
Figure 11E:
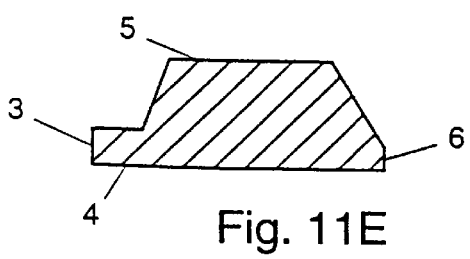

FIG. 10 shows rod part 2 provided with two cam-shaped parts 7a and 7b. The distance of the cam-shaped parts in relation to the ends of rod part 2 are indicated with A and B, respectively. In the case of a symmetrical horseshoe, these distances A and B are equal. In the case of a horseshoe designed for the left hoof, the distance A will be bigger than B, and in the case of a horseshoe designed for the right hoof, the distance A will be smaller than B.

FIG. 9 also clearly shows a cut 11a which is preferably provided after the plastic deformation for the formation of each clip 8 and before the bending of rod part 2. However, as already mentioned above, it is also possible that rod 1 from which the horseshoe is formed is already provided with groove 11 in which cut 11a can be formed later by means of a post-treatment. Moreover, after the plastic deformation for the formation of each clip 8 and before the bending of rod part 2, the ends of rod part 2 may be bevelled at bottom side 5 such that sponges 10 are formed. Sponges 10 are clearly visible in the sectional view represented in FIG. 9C.

Figure 9B:
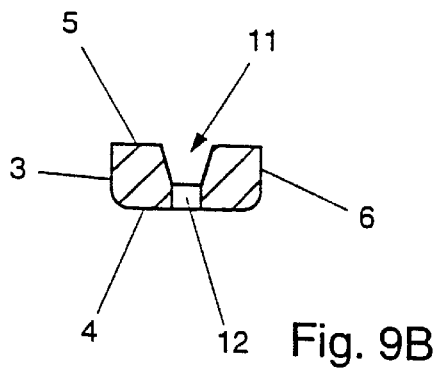
FIG. 9B shows a sectional view along line IX—IX of FIG. 9.
Figure 9C:
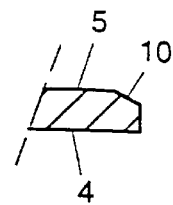
FIG. 9C shows a sectional view along line X—X of FIG. 9.

FIG. 9B also shows a section of the horseshoe at the height of a rivet hole 12. Rivet holes 12 are already partly pre-formed when cut 11*a* is formed. After the bending of rod part 2 to form the horseshoe and after the horseshoe has been flattened, horseshoe may be cooled. The rivet holes 12 may subsequently be easily punched through the horseshoe in a cooled state.

It is clear that the invention is by no means restricted to the above-described embodiment, and that various modifications can be made to it while still remaining within the scope of the invention. What is essential is that, by blanking out part of longitudinal side 3 of rod part 2, cam-shaped part 7 remains which provides the material from which clip 8 can be formed. In this way, a horseshoe with a clip which coincides with the outer contour of the horseshoe is obtained.

I claim:

1. A method for manufacturing a horseshoe with at least one clip, comprising the steps of:

performing a first cutting action to form a rod part with a predetermined length by cutting it from a straight rod, said rod part having a first longitudinal side, a top side, a bottom side, a second longitudinal side and two ends, and said length being determined in accordance with a desired size horseshoe to be made;

performing a separate second cutting action to blank out said first longitudinal side using a cutting tool such that at least one cam-shaped part remains on said first longitudinal side;

subsequently plastically deforming said cam-shaped part such that a clip is formed which extends substantially perpendicular to said top side; and bending said rod part such that a horseshoe is formed.

2. A method for manufacturing a horseshoe according to claim 1, further comprising the step of: bringing said rod part to a forging temperature before plastically deforming said cam-shaped part.

3. A method for manufacturing a horseshoe according to claim 2, further comprising the steps of:

flattening said rod part after bending said rod part; and punching rivet holes through said horseshoe after it has cooled from said forging temperature.

4. A method for manufacturing a horseshoe according to claim 1 further comprising the step of: after blanking out said first longitudinal side, working at least one edge of said rod part which forms a transition between said first longitudinal side and said top side or said bottom side such that said transition is provided with a radius.

5. A method for manufacturing a horseshoe according to claim 1, further comprising the step of: after blanking out said first longitudinal side, working at least one edge of said rod part which forms a transition between said first longitudinal side and said top side or said bottom side such that said transition is provided with a bevel.

6. A method for manufacturing a horseshoe according to claim 1, wherein said first longitudinal side is blanked out such that only one cam-shaped part remains on said first longitudinal side located equidistant from said ends so that a symmetrical horseshoe may be formed.

7. A method for manufacturing a horseshoe according to claim 1, wherein said first longitudinal side is blanked out such that only one cam-shaped part remains on said first longitudinal side located closer to one of said ends than the other so that an asymmetrical horseshoe may be formed.

8. A method for manufacturing a horseshoe according to claim 1, wherein said first longitudinal side is blanked out such that two cam-shaped parts remain on said first longitudinal side located at approximately $\frac{1}{3}$ and $\frac{2}{3}$ of said length.

9. A method for manufacturing a horseshoe according to claim 1, further comprising the step of: after plastically deforming said cam-shaped part and before bending said rod part, providing a cut in said rod part.

10. A method for manufacturing a horseshoe according to claim 1, further comprising the step of: after plastically deforming said cam-shaped part and before bending said rod part, beveling said bottom side of said rod part at said ends such that sponges are formed.

11. A method for manufacturing a horseshoe according to claim 1, further comprising the steps of:

flattening said rod part after bending said rod part; and punching rivet holes through said horseshoe.

12. A method of manufacturing a horseshoe with at least one clip, comprising the steps of:

forming a rod part with a predetermined length by cutting it from a straight rod, said rod part having a first longitudinal side, a top side, a bottom side, a second longitudinal side and two ends, and said length being determined in accordance with a desired size horseshoe to be made;

blanking out said first longitudinal side using a cutting tool such that at least one cam-shaped part remains on said first longitudinal side;

subsequently plastically deforming said cam-shaped part such that a clip is formed which extends substantially perpendicular to said top side and which stands exactly on said first longitudinal side; and bending said rod part such that a horseshoe is formed.

* * * * *